United States Patent Office 3,331,741
Patented July 18, 1967

3,331,741
PROCESS FOR THE PREPARATION OF A SOLUBLE BACTERIAL EXTRACT
Joachim Anschel, Convent, Alfred E. Fox, Hackettstown, George L. Evans, Hopatcong, and Benjamin S. Schwartz, Livingston, N.J., assignors to Warner-Lambert Pharmaceutical Company, Morris Plains, N.J., a corporation of Delaware
No Drawing. Filed Dec. 3, 1964, Ser. No. 415,818
3 Claims. (Cl. 167—78)

ABSTRACT OF THE DISCLOSURE

A process for extracting immunologically active components from cells of *Mycobacterium phlei* by treating said *M. phlei* with an aqueous solution containing about 30% by weight of urea, passing the resulting mixture through a filter and collecting the filtrate.

---

This invention relates to a novel method for the preparation of a soluble bacterial extract. More particularly, this invention relates to a new and improved method for the selective solubilization of immunologically active components from ruptured or whole, live cells of *Mycobacterium phlei* by means of urea.

Certain cell wall components of *Mycobacterium phlei* have been found to produce a stimulatory action on the reticuloendothelial system and as a result of this stimulation the defense system of the host receiving these cell wall extracts exhibits increased resistance against invading pathogenic organisms. This phenomenon is described in copending application Ser. No. 189,696, filed Apr. 24, 1962, now U.S. Patent No. 3,172,815. Thus, for example, in experiments where warm-blooded mammals such as mice receive an aqueous extract of the cell wall fractions of *M. phlei* and are later challenged with a lethal dose of *Salmonella enteritidis*, these mice survive, whereas those which have not received the protective *M. phlei* extract die as a result of the ensuing Salmonella infection. It is thus obvious that the cell wall components of *M. phlei* are important prophylactic agents. On the other hand, the cell wall extracts of these bacteria contain many other substances such as polysaccharides or other cell wall materials which may not possess any significant immunological properties.

Accordingly, a primary object of this invention is to provide a method which would selectively extract the immunologically significant fraction of the *M. phlei* cell wall components.

Another object of this invention is to provide a simple and rapid method for separating an immunologically significant fraction of *M. phlei* by extraction procedures.

A further object of this invention is to prepare an immunologically significant fraction of *M. phlei* having enhanced stability.

Other objects and advantages of this invention will become apparent from the following detailed description.

According to this invention, the *M. phlei* preparation to be extracted is prepared by the process described in copending application Ser. Nos. 189,696 and 260,851, now U.S. Patent No. 3,164,533. Briefly, these aqueous extracts are prepared therein by inoculating a vegetative inoculum of *M. phlei* into a sterile nutrient medium containing assimilable sources of carbon, nitrogen and essential ions. The inoculated culture is allowed to grow at 37° C. under constant agitation and aeration for about 7 days after which the whole viable cells of *M. phlei* are harvested and suspended in an aqueous solvent. The whole cell suspension is ruptured by passage through a narrow opening formed by two surfaces moving at high speed with respect to each other.

The resulting aqueous suspension containing about 0.1% by weight of the ruptured *M. phlei* cell preparation is then mixed with an aqueous solution containing about 10 to 30% by weight of urea. After thorough mixing, the suspension obtained is passed through a suitable filter press having a pore dimension of not greater than about $0.22\mu$. The filtrate which comes through is substantially clear and contains no residual cell wall material. While this urea solubilized fraction is highly active in protecting animals against invading microorganisms, it is preferable to remove the urea to give an even purer fraction. This may be effected by dialyzing the above urea extract against water. The immunologically active extract is obtained as the nondialyzable fraction, which can be used as such or can also be lyophilized to facilitate storage.

This extract may also be beneficial in the treatment of intracellular infections where known antibiotics usually have limited or no efficacy. Because this material increases the phagocytic process, it may facilitate the entry of antibiotics into the cell, thus providing an effective means for combating infections of this type.

In order to illustrate the present invention further, the following examples are given:

Example 1

2.0 ml. of a 0.1% by weight suspension of ruptured *M. phlei* cell preparation prepared according to said copending application Ser. No. 189,696 are added to 80 ml. of a solution containing approximately 30 g. of urea in distilled water. The mixture is thoroughly mixed and diluted to 100 ml. with more distilled water to give a final concentration of approximately 0.2 mg./ml. of *M. phlei* in 30% urea. This mixture is filtered through a type GS Millipore filter, having an average pore dimension of about $0.22\mu$, under positive pressure. The filtrate thus obtained is transferred into a suitable cellophane casing and is dialyzed against running water to remove the urea at a temperature of about 4° to 25° C. The nondialyzable fraction remaining has the following biochemical composition.

TABLE I.—BIOCHEMICAL COMPOSITION OF THE NONDIALYZABLE FRACTION OF *M. Phlei*
[Values expressed as percent of total solids]

|  | Percent |  | Percent Composition |
|---|---|---|---|
| Total Carbohydrate | 11.6 | Bound | 19.9 |
|  |  | Free | 80.1 |
|  |  | Hexoses | 60.8 |
|  |  | Pentoses | 39.2 |
| Total Phosphorus | 1.9 | Bound | 90.8 |
|  |  | Free | 9.2 |
| Ether-Soluble Lipids | 60.0 | Bound | 16.7 |
|  |  | Free | 83.3 |
| Total Nitrogen | 2.0 |  |  |
| Toral Protein (Lowry) | 16.4 |  |  |
| Total Protein (Calculated)* | 12.5 |  |  |
| Nucleic Acids | 14.0 |  |  |

*Total Nitrogen Value×6.25.

Spectrophotometric analysis of this material shows the presence of 255 to $260\mu$ absorbing material which can be removed by precipitation with protamine sulfate.

In addition, this extract has been found to be completely stable following storage for more than 2 months at temperatures ranging from −70° C. up to 37° C.

Example 2

In order to show the effectiveness of the extract obtained in Example 1 in protecting mice against *Salmonella*

*enteritidis* infection, the following tests were performed:

Normal female mice weighing approximately 20 to 22 g. are given graded doses of the above extract orally in amounts varying from 1 to 15 micrograms. The treated animals are then challenged 8 days later by the intravenous administration of 0.2 ml. of a $10^{-6}$ dilution in saline of a live, virulent suspension of *Salmonella enteritidis*. The control mice (those which have not received any extract) also receive the same intravenous injection of *Salmonella enteritidis*. Both groups of mice are then observed over a period of 15 days for any mortality. It is observed that those mice which do not receive any of the above extract all die within a period of 10 days, whereas up to 90% of the mice receiving the extract are still alive at that time.

It is understood that the foregoing detailed description is given merely by way of illustration and that many variations may be made therein without departing from the spirit of our invention.

Having described our invention, what we desire to secure by Letters Patent is:

1. Process for the preparation of a soluble extract of bacteria preparations which comprises contacting an aqueous solution containing about 10 to 30% by weight of urea with an aqueous suspension of said bacteria preparation, passing the resulting mixture through a filter having a pore dimension not greater than about $0.22\mu$ and collecting the filtrate.

2. Process for the preparation of an immunologically significant fraction of *M. phlei* which comprises intimately contacting an aqueous solution of about 10 to 30% by weight of urea in water with an approximate 0.1% by weight solution of said *M. phlei* preparation in water, passing the resulting suspension through a filter press having a pore dimension not greater than about $0.22\mu$, collecting the filtrate and dialyzing said filtrate against water.

3. The nondialyzable extract obtained according to claim 2.

No references cited.

LEWIS GOTTS, *Primary Examiner.*

ELBERT L. ROBERTS, *Examiner.*

RICHARD L. HUFF, *Assistant Examiner.*